Dec. 26, 1950 — R. H. GADRET — 2,535,730
PROCESS FOR THE TREATMENT OF WASTE LIQUORS DERIVED FROM CELLULOSE MANUFACTURE
Filed Sept. 28, 1948 — 2 Sheets-Sheet 2

INVENTOR
Rene H. Gadret

BY Stevens, Davis, Miller & Mosher
ATTORNEYS

Patented Dec. 26, 1950

2,535,730

UNITED STATES PATENT OFFICE 2,535,730

PROCESS FOR THE TREATMENT OF WASTE LIQUORS DERIVED FROM CELLULOSE MANUFACTURE

René H. Gadret, Mimizan-Bel Air, France, assignor of one-half to Papeteries de Gascogne (Societe Anonyme), Mimizan, France, a company of France Application September 28, 1948, Serial No. 51,642
In France October 8, 1947

5 Claims. (Cl. 23—48)

It is known that, in order to obtain cellulose pulp from ligneous vegetables, chemical treatments based on the solubility of lignin in alkalis and bisulphites, are more and more resorted to. After cooking raw material, usually wood in minute pieces, in an autoclave a liquid is obtained besides cellulose pulp; this liquid coloured brown by agglomerants of cellulose fibres is usually termed "black liquor" or residual liquor.

Black liquor contains, on an average, about 52% of wood components, the remainder of these components, mainly consisting in cellulose, being left in the pulp; these 52% comprise about 40% wood in the form of lignin, and 12% in the form of sugars and resins. Black liquor is itself composed mainly of water and also of dry substances about a third of which are of inorganic nature (e. g. sodium hydroxide, sodium carbonate, sodium sulphate, sodium sulphide, etc., when the so-called "sulphate" process has been applied, i. e. a treatment by an aqueous solution of sodium hydroxide and of sodium sulphide), and about two thirds of which are of organic nature (mainly lignin).

It may be desired to recover from black liquor various valuable components but recovery is generally limited to inorganic substances, with the object of reconstituting a liquor for the treatment of a new batch of wood; combustion of organic substances may accessorily be used for simultaneous production of steam.

Elimination of water contained in black liquor sets up a problem difficult to solve on an industrial scale, i. e. more particularly, with low costs.

That is why concentration is customarily carried out first, in multiple effect evaporators, then the concentrated liquor is calcined by casting it on or making it trickle over the walls of a furnace to which it adheres; the liquor then completes its dehydration on these walls, it ceases to adhere to them and falls on the bottom of the furnace; there, the carbon contained in lignin burns and inorganic substances melt and flow out through a tap-hole. This process bears various disadvantages: first, the production capacity of the furnace depends simultaneously on temperature which has to prevail (about 900–1000° C.) and on evaporating surface; this deprives the process of any flexibility; besides, owing to high temperature (which requires the use, in the furnace, of a costly refractory lining which is rapidly damaged), inorganic substances are carried off to the stack, due to sublimation; hence it is necessary to provide for dedusters and undertake frequent sweepings in the recovery boilers set up downstream relatively to the furnace.

More recently, it has been suggested to evaporate black liquor in two steps; in a first step, the usual process is carried out in multiple effect evaporators and, in a second step, concentrated liquor, in the form of films, is introduced into a draught of hot gases, whereby a practically dry substance (about 10% moisture) is obtained in less than 2 minutes. For this purpose, slowly rotating discs are used which are immersed into a bath of black liquor in order to be coated with a thin layer which, during rotation, is brought into the gaseous draught and leaves on the disc a dry residue taken off by scrapers. This residue with a high content of lignin is then calcined in order to recover inorganic substances. Although this process offers an improvement, it still requires three operations before recovering inorganic substances in a practically pure state.

It is an object of my invention to provide a process for the treatment of residual liquors or black liquors, molasses of distillery and similar liquid fuels, which is free from disadvantages of known processes.

A further object is to provide for an easier evaporation of liquor water; to provide a more flexible process allowing a better control of temperatures to be effected; to allow for a greater flexibility in carrying out low temperature operations, and hence to decrease losses through sublimation, to do away with dedusters and to facilitate sweeping in recovery apparatus, and to avoid the use of special refractory linings, not to require the melting of inorganic substances, and finally to decrease the number of operations to be carried out.

With the foregoing objects in view, the process according to my invention essentially comprises forming, preferably by means of an atomizing fluid under pressure, a very fine suspension of black liquor in space in an unobstructed zone where prevails a temperature above 280° C. but not substantially exceeding 300° C., and introducing into said zone, in the very neighbourhood of the origin of the suspension, air in a quantity insufficient to ensure full combustion of components of said liquor. As a consequence, the almost instantaneous evaporation of water contained in the minute particles of black liquor in the region of entrance of air, is followed by partial combustion adapted to maintain the determined temperature, as well as by gasification of unburnt organic components; moreover, the inorganic components of the liquor eventually separate out and collect on the bottom of said zone without having melted; all these phenomena occur before any contact with the walls or other solid surface of said zone.

Gaseous products coming out of said zone may be burnt by means of an influx of air in a separate zone for generating heat.

In an embodiment of the invention, black liquor is enriched with combustible ingredients before atomization. For this purpose, it may be concentrated through known means. A further supply of such ingredients may be carried out as a modification or as a complementary step; it is particularly convenient to add a liquid fuel belonging to the hydrocarbon group. It is suitable to choose, for this purpose, a fuel whose density differs little from that of the liquor, in order to obtain an intimate mixture more easily. Among the various products extracted from petroleum, fuel-oil proved to be particularly convenient, especially as regards speed of operation; thus, in the laboratory, an evaporation period of 21 minutes 40 seconds was recorded in the case of liquor to which no fuel-oil had been added, whereas only one minute 20 seconds were necessary in the case of liquor to which fuel-oil had been added.

Such an addition of auxiliary fuel may be effected more particularly for starting and then, after a favourable temperature prevails in the combustion chamber, atomization is carried on with liquor to which no auxiliary fuel has been added. However, the combustion chamber may previously be brought to a temperature above 280° C., preferably between 400 and 450° C., by any other means.

For instance, black liquor containing about 50 to 55% dry substances (easily obtained, for example, at the outlet of a multiple effect evaporator) may, at least at the start, be used, 15 to 20% by weight of fuel-oil being added.

In order to give rise to the suspension, it is desirable to introduce black liquor into the treatment zone through a relatively large inlet, taking into consideration that it carries solid substances which would be able to clog small inlets, and to impinge on the liquor jet for breaking it up, a series of tangential jets of pressure fluid issuing from orifices around said liquor jet into a conical sheet having a large apex angle, so as to break up the liquor jet into a cloud of minute particles, then to introduce air, preferably under pressure, for securing combustion of fixed carbon to carbon monoxide, in order further to increase turbulence in the cloud. In order to maintain a swirling motion in the meeting region of fluids, known means may be resorted to, for instance imparting a gyration and translation component to the air jet, ensuring a downward spiral-shaped motion to the mixture so as to increase its time of free fall in suspension in space in the zone of treatment during which are successively carried out: the complete dehydration of combustible components of black liquor, gasification thereof, and the separation of inorganic substances to be recovered.

In order to perform atomization of the liquor, any fluid under pressure may theoretically be used, provided it is not liable to disturb the operation, but, in practice, only gases or vapours which may easily be obtained, are used. Thus, steam or any fuel gas, if at hand, may be used. However, compressed air is commonly resorted to; it is understood that the sum of the amounts of atomizing air and additional air must be kept below the quantity required for a full combustion, in order to maintain the above mentioned conditions of temperature in the treatment zone, and not to lower the quality of the gas produced for instance for heating recovery boilers.

The process according to my invention may be carried out in a vertical furnace of a known type without air inlets at its lower part and carrying at its top part the device for atomizing fuel and introducing primary air, as well as an outlet for the products of evaporation and partial combustion with gasification, the conditions for effecting atomization and the inner arrangement of the furnace being such that the above described phenomena take place in the inner space of the furnace, without the atomized liquor coming into contact with the walls.

In the process according to my invention, dehydration of black liquor and incomplete combustion of lignin take place at low temperature during only one phase, and without contact with any material support; inorganic components are collected at the bottom of the treatment zone in powder form or as minute particles, easy to be removed without any need to bring them to melting point. Hence, it is obvious that the above mentioned advantages are really acquired.

Owing to their pureness, obtained ashes may immediately be dissolved in an aqueous liquid in order to be directly used in a causticizing workshop. However, if it is desired to pass through the molten stage, operation may be carried out in a crucible. For instance, when wood has to be treated by the sulphate process, which thus requires a previous reduction of sulphate to sulphide, the carrying out of fusion in a crucible enables one to operate under optimum conditions, independent of those required by combustion in the furnace, and to employ costly lining materials solely in the crucible.

An example of a suitable furnace for carrying my process into practice is diagrammatically illustrated by the accompanying drawings in which.

Figure 1:
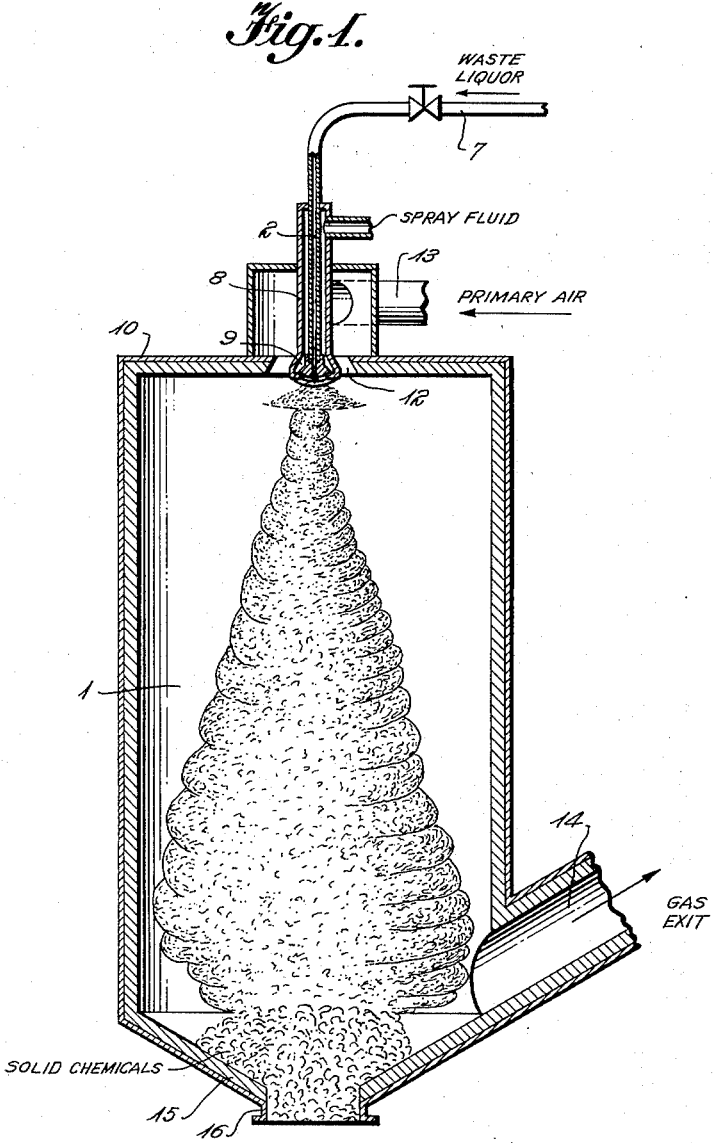
Fig. 1 is a diagrammatic vertical section of the furnace.

The furnace, generally denoted by reference character 10, provides an unobstructed treatment zone 1. Supported on the top thereof is pipe 2 for supply of black liquor or an admixture thereof with fuel-oil; pipe 2 opens into the top portion of zone 1 through a relatively large liquid outlet 3, and is supplied with black liquor or the like through a pipe 7.

Figure 2:
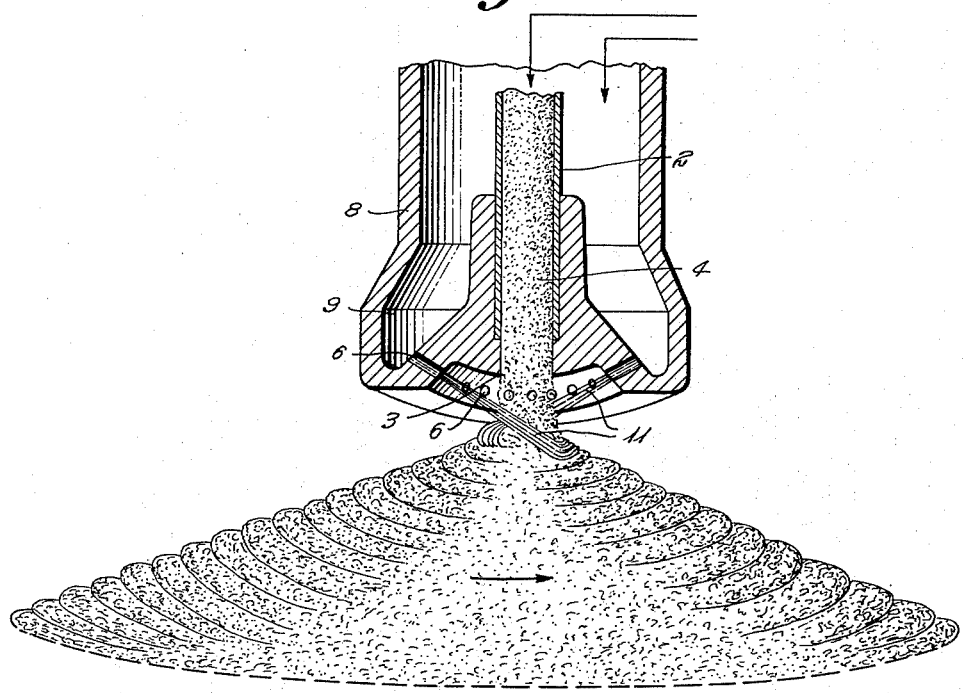
Fig. 2 shows the spraying device still diagrammatically, on an enlarged scale.
Figure 3:
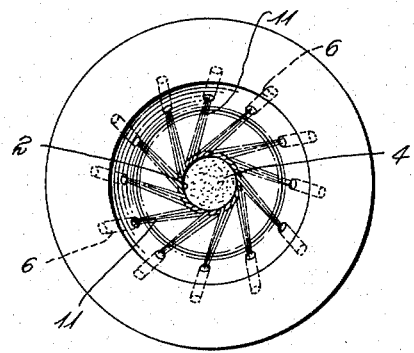
Fig. 3 is an end view of the spraying device looked upwardly from below.

Arranged around outlet 3 are a series of ports 6 for deliverey of atomizing fluid, preferably compressed air, supplied from a pipe 8, via an annular passage 9 around pipe 2; as better seen on Figs. 2 and 3, ports 6 slant downwardly and inwardly to provide jets 11 of atomizing fluid distributed on a cone of large apex angle and to strike the liquor stream 4 tangentially so as to split it up into a cloud of minute particles.

Provided in the top wall of furnace 10 around the atomizing device so far described, is an air supply ring aperture 12 to which compressed air is delivered from a pipe 13 and arranged to introduce an annular, downwardly flowing vortex of air which further carries round the gravitating cloud of liquor particles.

The furnace further comprises an exit for steam and gaseous products and a lower hopper 15 where separated inorganic substances fall and collect at 16, to be withdrawn from the base thereof.

What I claim is:

1. In a process for the recovery of normally solid inorganic components from aqueous waste liquors containing combustible components such as black liquor and distillery molasses, the steps of releasing a swirling suspension of very fine particles of said liquor in a vertical, unobstructed, confined zone where a temperature of the range of about 280° C. to about 500° C. prevails, from a point adjacent the top of said zone; supplying pressure air to said zone solely at the top thereof, in an amount insufficient to support complete combustion of said combustible components of said liquor, so as to bring about a partial combustion of said components to maintain said temperature within said range with consequent production of steam and gaseous products and release of solid chemicals from said liquor as said suspension progresses downwardly through said zone, said air being supplied in close proximity to the point of release of said suspension; removing said steam and gaseous products from said zone; and withdrawing said solid inorganic components from the bottom of said zone.

2. In a process for the recovery of normally solid inorganic components from aqueous waste liquors containing combustible components such as black liquor and distillery molasses, the steps of maintaining a downwardly flowing vortex of fine particles of said liquor in a vertical, unobstructed, confined zone where a temperature of the range of about 280° C. to about 500° C. prevails, from a point adjacent the top of said zone; feeding pressure air into said zone solely at the top thereof, in close proximity to said point, in an amount insufficient to support complete combustion of said combustible components of said liquor, so as to bring about a partial combustion of said components to maintain the temperature in said zone within said range with consequent production of steam and gaseous products and release of solid chemicals from said liquor as said particles progress downwardly through said zone; removing said steam and gaseous products from said zone; and withdrawing said solid inorganic components from the bottom of said zone.

3. In a process for the recovery of normally solid inorganic components from aqueous waste liquors containing combustible components such as black liquor and distillery molasses, the steps of maintaining a downwardly flowing stream of said liquor in a vertical, unobstructed, confined zone where a temperature of the range of about 280° C. to about 500° C. prevails, from a point adjacent the top of said zone; impinging a plurality of pressure fluid jets forming together a cone of large apex angle around said liquor stream, towards the periphery of said liquor stream, to meet the same tangentially in close proximity to said point, and thereby split up said jet into a downwardly gravitating vortex of minute liquor praticles; supplying pressure air to said zone, solely at the top thereof, at least partly as a jet arranged to meet said vortex and enhance the whirling motion thereof, the total amount of air introduced into said zone being insufficient for complete combustion of said combustible components of said liquor, so as to bring about a partial combustion of said components to maintain the temperature in said zone within said range with consequent production of steam and gaseous products and release of solid chemicals from said liquor as said particles progress downwardly through said zone; removing said steam and gaseous products from said zone; and withdrawing said solid inorganic components from the bottom of said zone.

4. In a process for the recovery of normally solid inorganic components from aqueous waste liquors containing combustible components such as black liquor and distillery molasses, the steps of forming a mixture of said liquor with a minor proportion of a liquid hydrocarbon having substantially the same specific gravity as said liquor, said mixture thus containing combustible ingredients; spraying said mixture downwardly at a point adjacent the top of a vertical, unobstructed, confined zone where a temperature of the range of about 280° C. to about 500° C. prevails; supplying pressure air to said zone, solely at the top thereof in close proximity to said point, in an amount insufficient to support complete combustion of said combustible ingredients in said mixture, so as to bring about a partial combustion of said ingredients to maintain said temperature within said range, with consequent production of steam and gaseous products and release of solid chemicals from said mixture as said sprayed mixture progresses downwardly through said zone; removing said steam and said gaseous products from said zone; and withdrawing said solid inorganic components from the bottom of said zone.

5. The process of claim 4, said liquor being concentrated black liquor containing 50–55% by weight of dry substances, and said hydrocarbon being fuel-oil in a proportion of 15–20% based on the weight of said concentrated black liquor.

RENÉ H. GADRET.

REFERENCES CITED

The following references are of record in the file of this patent:

UNITED STATES PATENTS

| Number | Name | Date |
|---|---|---|
| 424,756 | Blackman | Apr. 1, 1890 |
| 1,779,537 | Goodell | Oct. 28, 1930 |
| 1,900,320 | Wagner et al. | Mar. 7, 1933 |
| 2,036,213 | Hambly | Apr. 7, 1936 |
| 2,213,052 | Rosencrants et al. | Aug. 27, 1940 |
| 2,261,995 | Greenawalt | Nov. 11, 1941 |